United States Patent Office 3,255,604
Patented June 14, 1966

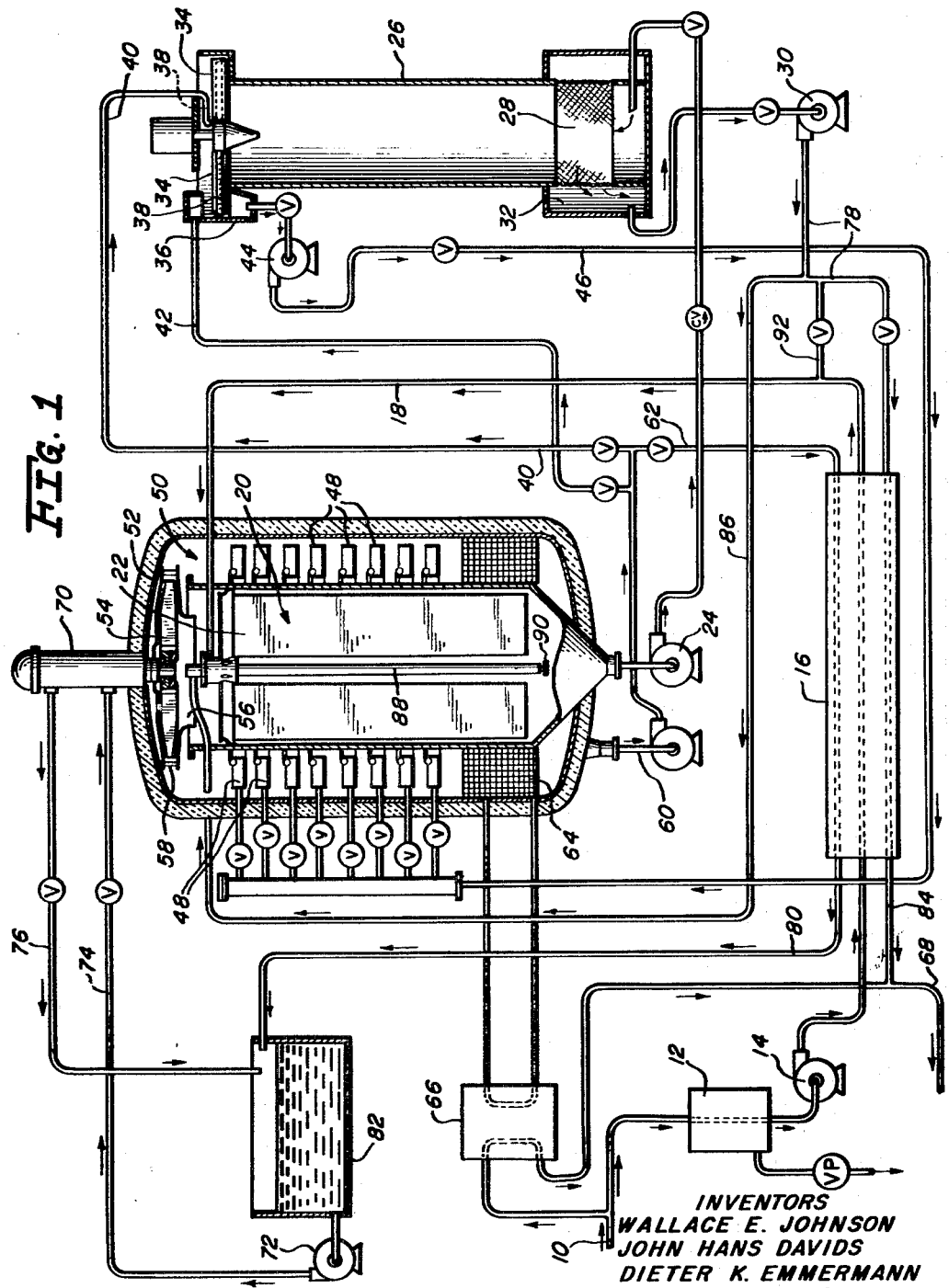

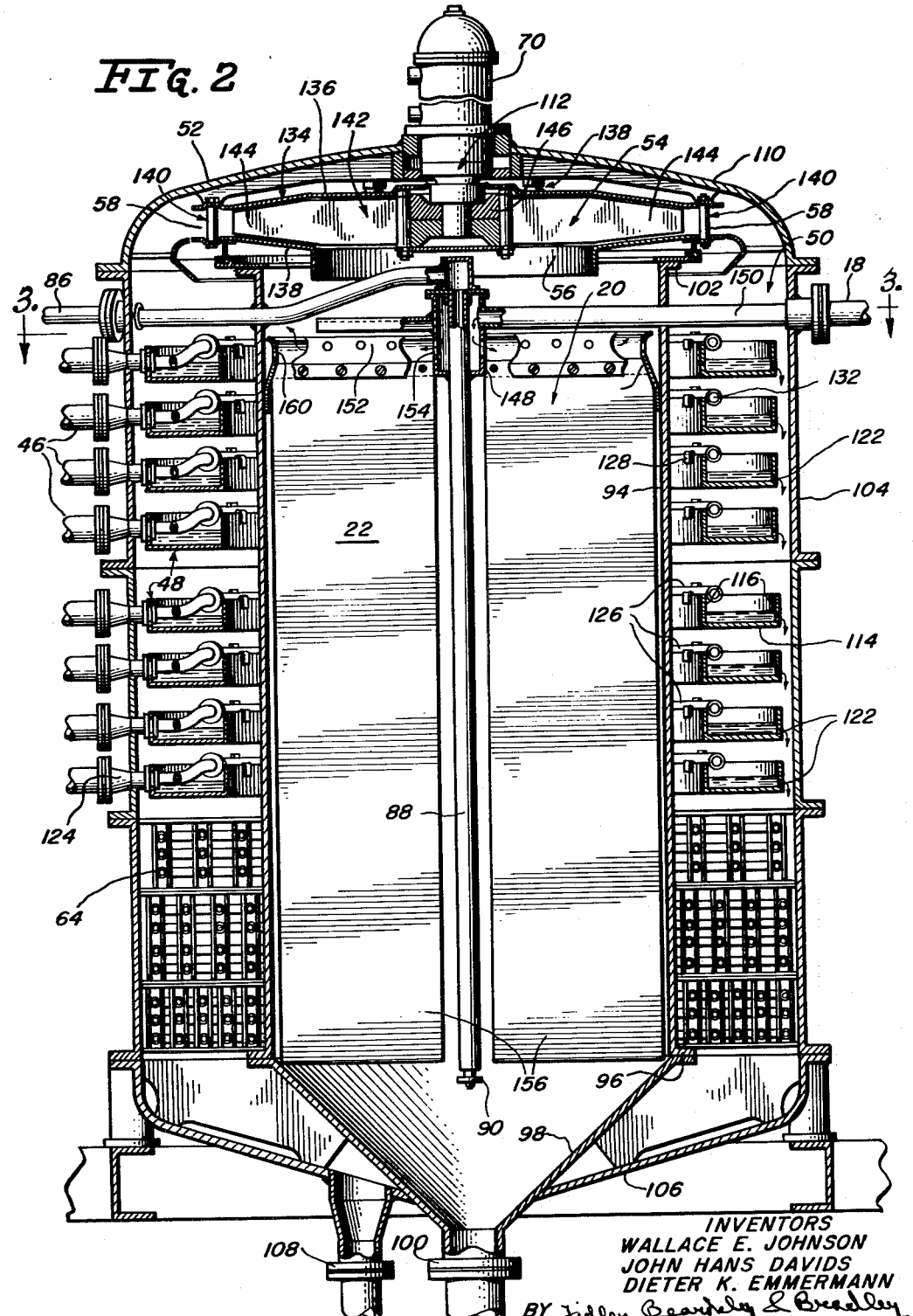

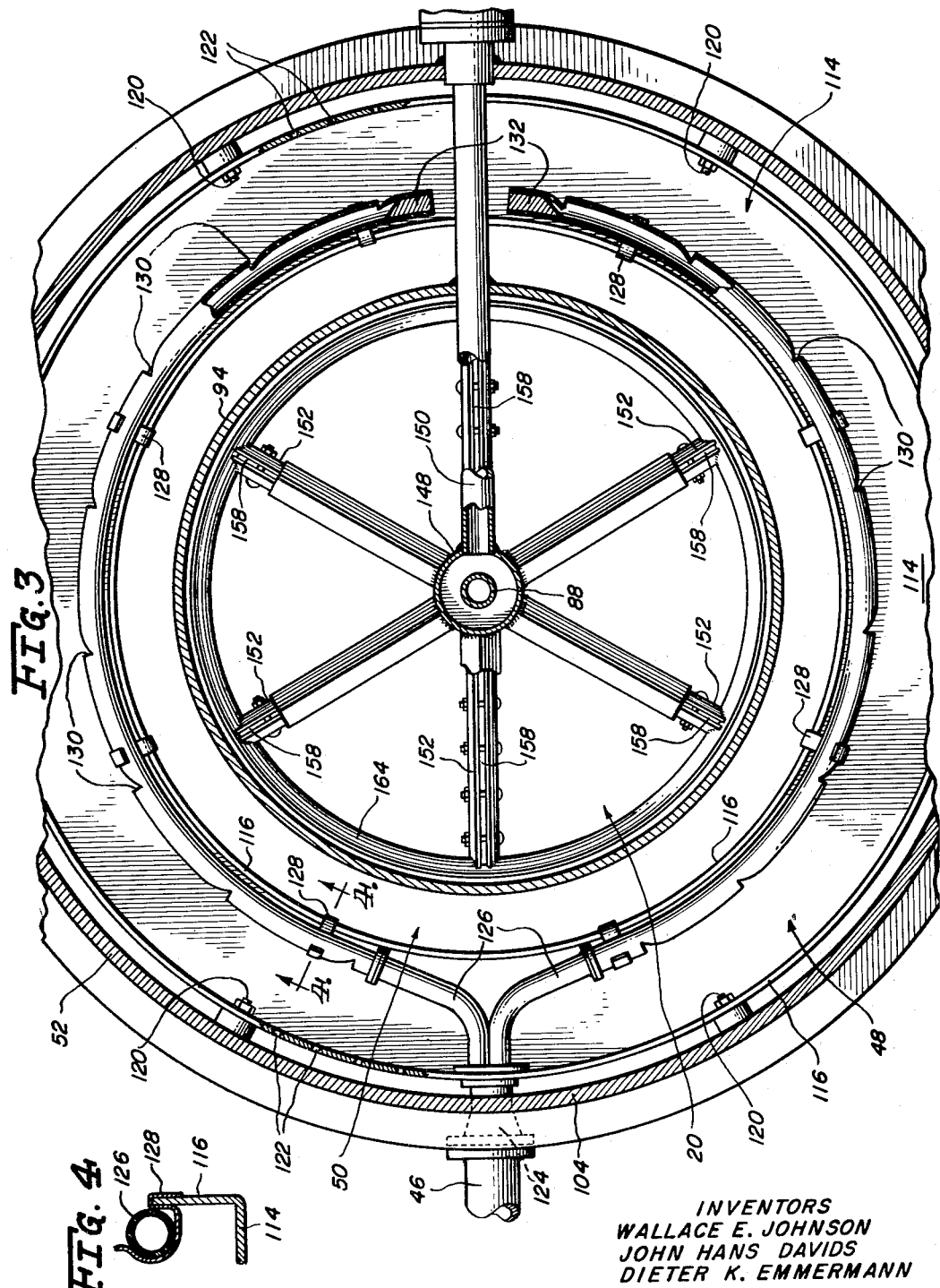

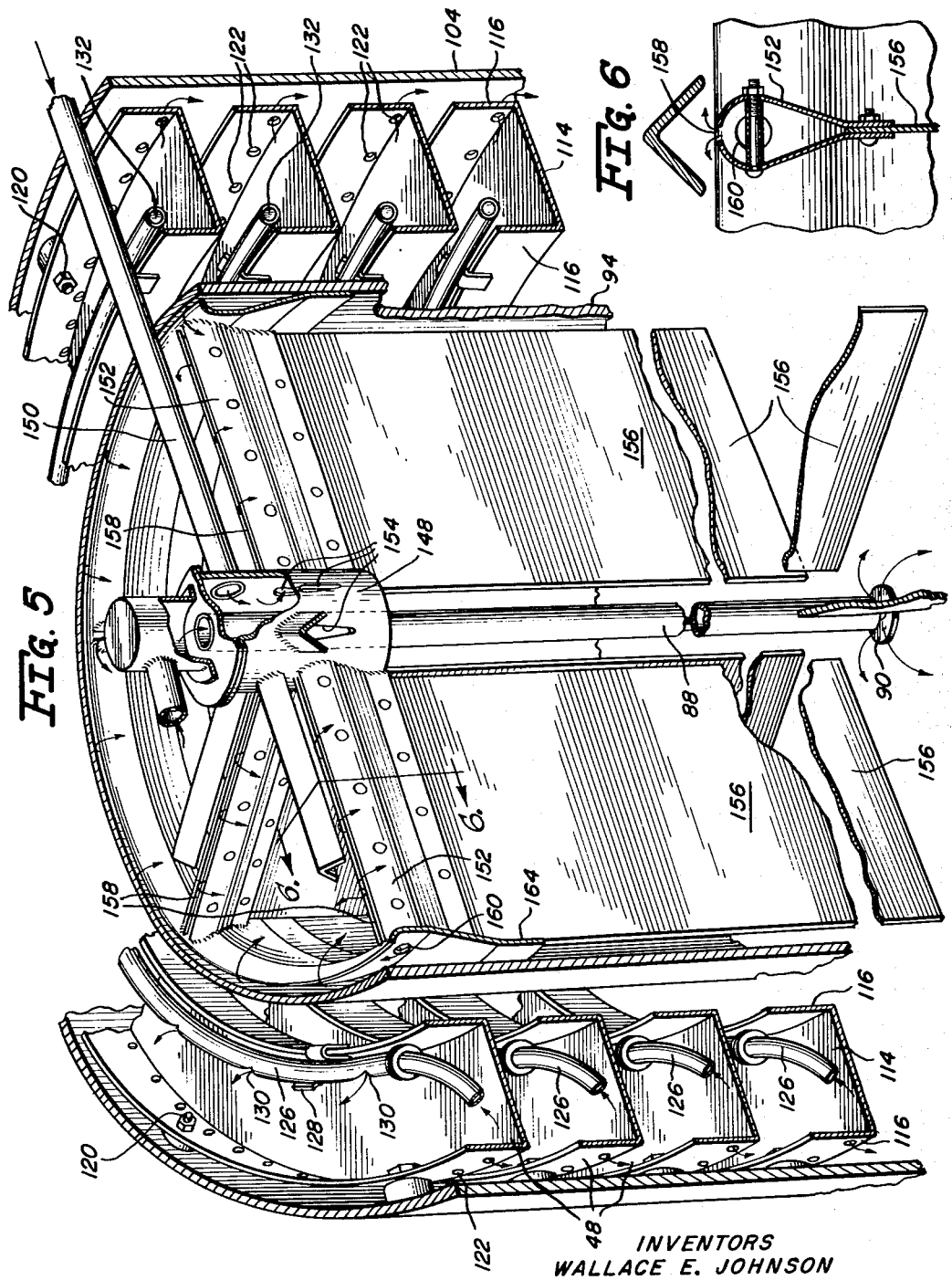

3,255,604
EVAPORATING AND CONDENSING CHAMBER
AND COMPRESSOR APPARATUS
Wallace E. Johnson, John Hans Davids, and Dieter K.
Emmermann, Beloit, Wis., assignors to Desalination
Plants (Developers of Zarchin Process) Limited, Tel
Aviv, Israel, a limited company of Israel
Continuation of application Ser. No. 103,113, Apr. 14,
1961. This application July 22, 1964, Ser. No. 384,508
24 Claims. (Cl. 62—123)

This is a continuation of application, Serial No. 103,113, filed April 14, 1961.

This invention relates to apparatus for separating a solute in substantially pure form from solutions and, more particularly, relates to evaporating and condensing chambers and compressor apparatus for such systems.

The apparatus of the present invention is hereinafter described in connection with a system for producing "sweet" water from sea water, but of course, the inventions are capable of application to other fields. While in the case of producing "sweet" water from sea water the primary product is "sweet" water, in other applications of the system, such as in dehydrating citrus fruit juices, the primary final product may be the concentrated remaining solution after removal of the solute, and the pure solute removed may or may not be of importance as a secondary product. Since the system hereinafter described is principally for desalting sea water, the expression "desalination" is used hereinafter in identifying the system, but it must be appreciated that this term is meant to include the various other applications of the system wherein a solute is to be separated from a solution.

One of the most serious and ever-present problems in many areas of the world today is the lack of fresh water. Many of these areas have a depressed standard of living, due directly to the lack of fresh water in substantial quantities. And yet, ironically enough, many of these areas are bounded by substantial bodies of sea water which, due to its salt content, is neither useful for human consumption nor for irrigation.

The problem of converting sea water to potable water has long been known and the solution has been pursued by many people over many years. There have been numerous methods proposed and operated that will produce potable water from sea water and, in fact, there are several systems in operation today. These systems, however, have only enjoyed limited success because they could not produce potable water in sufficient volume and at a reasonable cost, the cost being considered from the standpoint of equipment cost, maintenance, and/or the energy input requirements for the system. Not only must a desalination system be able to produce large volumes of potable water, but the cost is of extremely great importance. As previously pointed out, in the substandard areas of the world, this problem is most pressing and high cost of equipment, maintenance, and operation would be most severely felt in such areas.

A great deal of attention has been given to this problem in recent years and has resulted in a vacuum-freezing system for producing "sweet" water that is basically sound in principle. However, that system has fallen short of success because the method, system, an apparatus used and proposed failed to result in a system that would desalt large volumes of sea water economically. Economy of equipment cost and operation cost cannot be overemphasized and, simply stated, if the system is not economical, it fails.

As the result of intensive work, my associates and I have developed methods, systems, and apparatus for desalination which economically produce large volumes of "sweet" water and these are the subject of copending U.S. patent application, Serial No. 103,114, filed April 14, 1961, for "Methods, Systems, and Apparatus for Separating a Solute in Substantially Pure Form From Solutions," which is hereby incorporated herein by reference.

This application relates to the construction and arrangement of the evaporating and condensing chambers and compressor apparatus. The sea water is flash-evaporated in the evaporating chamber, forming pure water vapor, pure ice, and concentrated brine. In the condensing chamber, the pure water vapor and ice are brought together to condense the vapor and simultaneously melt the ice to produce the final "sweet" water product and the compressor serves the primary function of moving the vapor from the evaporating chamber into the condensing chamber.

Generally speaking, the evaporating and condensing chambers and compressor apparatus consist of a cylindrical evaporating tank which has an inlet for supplying precooled sea water; apparatus in the evaporating tank for providing ample surface exposure of the sea water; a concentric coaxial condensing tank larger than and surrounding the evaporating tank to provide a condensing chamber between the walls of the tanks; an inlet into the condensing chamber for admitting ice; apparatus within the condensing chamber to provide sufficient contact between vapor and ice for effective condensation and melting; and a radial compressor coaxially aligned with the chambers and disposed within one of the chambers to move the vapor radially from the evaporating chamber into the condensing chamber.

An object of the invention is to provide evaporating and condensing chambers and compressor apparatus which are economical in cost and efficient in operation.

A further object of the invention is to provide efficient and economical evaporating and condensing chambers and compressor apparatus in which heat losses and cost of preventing heat losses are reduced to a minimum.

A still further object of the invention is to provide efficient, economical evaporating and condensing chambers and compressor apparatus which is relatively inexpensive to construct, due to the arrangement thereof, and results in a reduction in material needed.

Another object of the invention is to provide evaporating and condensing chambers and compressor apparatus wherein the chambers and compressor are concentric, and one chamber surrounds the other.

Still another object of the invention is to provide efficient and economical evaporating and condensing chambers and compressor apparatus wherein one chamber effectively insulates the other chamber and houses the compressor so that the material necessary to produce one of the chambers and to house the compressor is reduced.

A further object of the invention is to provide evaporating and condensing chambers and compressor apparatus achieving the above objects and which includes apparatus for distributing sea water in the evaporating chamber and/or apparatus for providing ample surface contact between the vapor and ice in the condensing chamber.

Another object of the invention is to provide an arrangement of the evaporating and condensing chambers and compressor apparatus whereby large volumes of vapor may be handled with economical equipment.

Another object of the invention is to provide evaporating and condensing chambers and compressor apparatus wherein one of the chamber walls provides the effective support housing for the compressor.

A further object of the invention is to provide evaporating and condensing chambers and compressor apparatus wherein vapor travels in a short and direct path between the chambers through the compressor.

A still further object of the invention is to provide evaporating and condensing chambers and compressor apparatus wherein the chambers and compressor are concentrically arranged.

Yet another object of the invention is to provide evaporating and condensing chambers and compressor apparatus wherein the compressor, which operates at low pressure, is disposed within and supported by one of the chamber walls and the compressor has only a lightweight shroud.

These and other advantages will become more readily apparent as this description proceeds and is read in conjunction with the accompanying drawings in which:

FIG. 1 is a schematic layout of the desalination system;

FIG. 2 is an elevational view in section, showing in detail the construction and arrangement of the compressor and evaporating and condensing chambers;

FIG. 3 is a plan view in section taken on lines 3—3 of FIG. 2;

FIG. 4 is a detail sectional view taken on lines 4—4 of FIG. 3;

FIG. 5 is a partial perspective view showing the evaporating chamber, the apparatus for distributing sea water in the evaporating chamber, the condensing chamber and ice distributing trays for the condensing chamber; and FIG. 6 is a detail sectional view taken on lines 6—6 of FIG. 5.

GENERAL DESCRIPTION OF THE SYSTEM

The desalination system, a part of which are the evaporating and condensing chambers and compressor apparatus of the present invention, is shown as a general layout in FIG. 1. The novel evaporating and condensnig chambers and compressor apparatus are centrally located in FIG. 1. The general arrangement of the system will be first described.

Sea water, which is at ambient temperature, and which has been filtered to remove floating material and other solids is brought into the system through sea water inlet pipe 10 and passes through deaerator 12 where dissolved gas is removed from the sea water. The sea water is then delivered by pump 14 to heat exchanger 16, where the incoming sea water is placed in heat-exchange relationship with the potable water final product and concentrated brine being withdrawn from the system.

The sea water entering the system will be normally at ambient temperature, such as for example 77° F. and normally contains about 3.5% by weight of salt.

The sea water leaving heat exchanger 16 will be at a temperature of approximately 30.2° F. and is delivered through pipe 18 into the evaporating chamber 20. The sea water enters the evaporating chamber at the central hub of a distributor 22 and the water thereafter flows downwardly over depending sheets on the distributor so that the incoming sea water has a large surface exposure for evaporation.

The interior of the evaporating chamber 20 is maintained at a low pressure, approximately 3.2 mm. Hg (millimeters of mercury), by a vacuum pump not shown. Due to the fact that the interior of the evaporating chamber is at such low pressure, sea water will flash-evaporate therein. At the freezing temperature of sea water, the heat of vaporization is approximately 1,074 B.t.u. per pound and the heat of fusion of ice is about 144 B.t.u. per pound. As vapor is produced by evaporation, heat is removed from the remaining liquid and ice is formed therein. Due to the differences in heat of vaporization and heat of fusion, approximately 7½ pounds of ice will be produced for each pound of water vapor. The ice so produced is substantially pure water ice with no appreciable amount of salt contained therein. When continuous operation is established, the temperature within the evaporating chamber will be approximately 24.8° F. The vapor formed will be pure water vapor. Thus, upon removal of the pure water from the incoming sea water by the vaporizing and freezing, the remaining sea water becomes a more concentrated salt solution.

While theoretically in excess of 75% pure water by weight could be removed in the form of vapor and ice, we have found that removing approximately 50% by weight of pure water is in the range of greatest efficiency; thus, if approximately 50% of the water is removed as vapor and ice, the remaining brine solution will consist of approximately 7% by weight of salt.

The evaporation of water, with the consequent formation of vapor and ice, is a function of time since heat must be transferred, and also the rate of evaporation is proportional to surface area. In order to have the sea water remain in the evaporating chamber for a sufficient period of time and to offer large surface exposure of the sea water, the distributor 22 is disposed within evaporating chamber 20. This distributor is described in detail in the co-pending United States Patent application of John Hans Davids, Serial Number 85,522, filed January 30, 1961, for "Means for Freezing Exposure of Salt Water in a Salt Water Purification System," which is hereby herein incorporated by reference.

The brine, with the ice crystals therein, is withdrawn from the bottom of evaporating chamber 20 through pump 24, and this mixture has a temperature of approximately 24.8° F. The mixture is delivered to separator-washer or counter-washer 26, in which the ice is separated from the concentrated brine and the ice is washed free of salt adhering to the surface of the ice crystals. The ice-brine mixture enters the lower end of the separator-washer under pressure and the column of the separator-washer becomes essentially full of ice crystals. The pressure exerted by the entrance of the brine at the bottom of the counter-washer forces the cylinder of ice packed therein upwardly, and this brine forces its way through the ice pack, out through screens 28. A pump 30 removes the brine from jacket 32 around the lower end of the counter-washer. The pressure drop, created by forcing brine through the ice pack within the column, exerts a force on the column of packed ice moving it upwardly. Thus, the ice column within the counter-washer continuously moves upwardly. At the upper end thereof is a motor-driven scraper or wiper 34 which wipes off the top of the upwardly moving column of ice and delivers the ice into trough 36. Spray heads 38 are provided at the top of counter-washer 26 for spraying "sweet" water supplied by pipe 40 onto the top of the porous column of ice, which water runs downwardly over the advancing column of ice to wash away any adhering brine on the surface or in the interstices of the ice.

"Sweet" water is added by means of pipe 42 to the ice in trough 36. By supplying "sweet" water to the ice to provide a liquid with the ice suspended therein, the resulting material may be more readily handled, and the liquor prevents the breaking of the vacuum within the vacuum chamber. Ice-sweet water pump 44 is shown for delivering the material through pipe 46 to a plurality of trays 48 arranged concentrically within a condensing chamber 50.

Condensing chamber 50 is an annular chamber, having its inner dimension defined by the wall of the concentric evaporating chamber 20 and its outer dimension defined by the outer wall 52, which preferably is insulated as indicated in FIG. 1 to prevent heat from entering the system.

A radial compressor 54 is positioned within the upper end of condensing chamber 50 and has an axial intake opening 56 in communication with evaporating chamber 20 and a circular outlet 58 communicating with condensing chamber 50.

Vapor formed in evaporating chamber 20 is drawn into central inlet 56 of compressor 54 and delivered radially outward into condensing chamber 50 through outlet 58. The vapor is thus compressed and compressor 54 maintains condensing chamber 50 at a pressure of approximately 4.6 mm. Hg. The vapor delivered by the compressor into the condensing chamber passes downwardly into contact with the ice disposed in trays 48 and simultaneously causes the vapor to condense and ice to melt. The "sweet" water thus produced is withdrawn from the lower end of condensing chamber 50 through pipe 60, which delivers a portion of the "sweet" water back to counter-washer 26 through pipes 40 and 42 for ice washing and for mixing with the ice. The majority of the "sweet" water product passes through pipe 62 to heat exchanger 16.

One of the greatest difficulties encountered in prior art vacuum freezing systems is their inability to efficiently and economically handle and transport the large volumes of vapor that exist for any system producing a meaningful amount of "sweet" water, particularly when it is recognized that we are dealing with such low pressures that approximately 4,500 cubic feet of vapor at these pressures is required to provide one pound of water vapor. Without the arrangement, construction, and apparatus of this invention, expensive and extremely large shrouds and conduits would be required for transporting the vapor. Normally, to move any such large volume, a multi-stage axial compressor would be required and this alone without considering the conduit size and expense would make the system uneconomical.

Additionally, by positioning the compressor within one of the chambers, the pressure differential across the shrouds is so slight that a very inexpensive shrouding may be used on the compressor. In essence, the housing of the vessel into which the compressor discharges is the real structural support housing of the compressor.

Likewise, with the arrangement proposed, the compressor serves as a self-regulator upon the system since the amount of vapor that can be handled by the compressor will control the rate at which vapor is formed by vaporization and the rate at which it is condensed.

Ideally, the vapor should be delivered to the evaporating chamber at saturation conditions of pressure and temperature so that the vapor will condense on the 32° F. ice and the ice will take out of the vapor 1,074 B.t.u. per pound of vapor condensed and thereby cause the 32° F. ice to melt by each pound absorbing 144 B.t.u. However, due to losses because of heat entering the system and superheating of the vapor, secondary refrigeration coils 64 are provided in condensing chamber 50. These coils condense enough vapor to provide thermal balance in the process. The coils 64 are cooled by a conventional refrigeration unit 66 in which sea water, tapped from sea water inlet 10, may be circulated and then discharged through waste outlet 68.

The motor 70 for driving the compressor is located outside of condensing chamber 50 so that it will not introduce heat into the system, and the drive mechanism between the motor and the compressor is of a unique type. Motor 70 is flooded with water delivered to the motor housing by pump 72 through pipe 74 and this water is circulated through the motor housing and discharged through pipe 76. This drive mechanism provides an effective seal for the drive shaft of the compressor, without the use of expensive and elaborate mechanical seals, which are normally required for such high pressure differentials, by allowing leakage of "sweet" water from the motor housing into the compressor. "Sweet" water flowing in the motor housing cools the motor and that portion of the "sweet" water leaking into the compressor flash-evaporates to cool the compressed vapor and partially reduce the super-heat in the vapor.

As previously described, the final product, potable water, is delivered from condensing chamber 50 through pipe 62 to the heat exchanger 16 and is at a temperature of approximately 32° F. The concentrated brine which has been separated from the ice in counter-washer 26 is delivered via pump 30 to the heat exchanger through pipe 78 and is at a temperature of approximately 24.8° F.

The purpose of the heat exchanger is to cool the incoming sea water to the maximum extent possible by withdrawing heat therefrom and delivering it to the cold brine and "sweet" water produced, and it is important that the sea water be cooled as efficiently as possible. Again, the question of economy so dominates the desalination system that new approaches, concepts, constructions, and arrangements of the heat exchanger were required in order to meet the objective of practical, economical equipment. With heat exchanger 16, approach temperatures of about 2° F. have been achieved and, thus, sea water entering the system through cold sea water pipe 18 is at about 30.2° F.

The "sweet" water, as it leaves heat exchanger 16 through pipe 80, is the principal product of this system and is delivered to storage tank 82 from which it may be withdrawn for use. The warmed concentrated brine, as it leaves heat exchanger 16 through pipe 84, is delivered to the waste outlet 68 for return to the sea or for other use or disposal. As previously mentioned, the principal product of the system described is potable water, but of course, it will be readily appreciated that the concentrated brine could be used for further processing to produce salt or, if other raw products such as fruit juices were initially supplied to the system, the concentrated fruit juice delivered from the heat exchanger would be the principal product and the potable water would be a useful by-product.

It shall be noted that a higher pressure is necessary in the condensing chamber than in the evaporating chamber because the vapor pressure of the freezing brine is lower than the vapor pressure of the ice-water mixture at 32° F. The vapor pressure of brine of 7% by weight salinity at 24.8° F. is about 3.2 mm. Hg, while the vapor pressure of ice-water mixture at 32° F. is about 4.6 mm. Hg. The compressor maintains this condition.

It has been found advisable to re-circulate a portion of the cold brine in order to prevent ice from building up within the evaporating chamber and thereby plugging the system and stopping continuous operation. Thus, a portion of the cold brine taken from counter-washer 26 is delivered by pump 30 into pipe 86, which connects with a tube 88 of the distributor 22, which has a spray head 90 disposed at the bottom thereof in the evaporating chamber. Likewise, a portion of the cold concentrated brine is delivered by pump 30 through brine pipe 78 and intermediate pipe 92 to incoming cold sea water pipe 18. Thus, cold concentrated brine is mixed into incoming sea water and passes through the evaporating chamber 20 over distributor 22, and this mixture is joined at the bottom of evaporating chamber 20 by sprayed-in concentrated brine from spray head 90. This introduction of concentrated brine with the sea water does not interfere adversely with the evaporation and formation of vapor and ice, but conversely does prevent ice from building up on distributor 22. In addition, small ice crystals escaping from the drainage area of the counter-washer are thus reintroduced into the system to promote crystallization. Also, the greatest amount of ice is present in the ice-brine mixture at the bottom of evaporating chamber 20 and there is a tendency for ice build-up at that point. However, the introduction of additional brine increases the fluidity of the total mixture and also has a flushing action at the bottom of the evaporating chamber.

In any commercially successful desalination system, relatively large volumes of potable water must be produced and, while this may be effected by building larger and larger equipment, again, within shadow of commercial unacceptance due to high cost, the size of the equipment must be reasonable. With the system, schematically shown in FIG. 1, it is contemplated that approximately 60,000 gallons of potable water per 24-hour day would be produced. Rather than attempt to increase the size of the equipment and thereby add to its expense out of proportion to gain, it is contemplated that when larger production of potable water is required, which will normally be the case, separate but parallel systems will be installed and operated to supply additional requirements.

EVAPORATING AND CONDENSING CHAMBER CONSTRUCTION

The evaporating and condensing chambers are shown in section and elevation in FIG. 2 of the drawings and are shown in greater and more specific detail in FIGS. 3 and 5 of the drawings, to which reference is invited.

Evaporating chamber 20 comprises a cylindrical wall 94 which terminates at its lower end in an outwardly directed flange 96. Secured to flange 96 and extending downwardly therefrom is a conical drain 98 which is provided at its lower end with pipe fitting 100 for connection to the conventional piping of the system. The upper end of wall 94 also terminates in a flange 102 which the compressor 54 engages.

Disposed within chamber 20 is distributor 22 having connections through the wall of chamber 20 with brine pipe 86 and incoming sea water pipe 18. Chamber 20 is a closed chamber, except for the discharge opening at the bottom and communication with the compressor at the top. A pressure of about 3.2 mm. Hg is maintained in the chamber by the compressor in conjunction with a vacuum pump not shown connected to condensing chamber 50.

The inner confines of condensing chamber 50 are provided by cylindrical wall 94 and the outer confines are defined by cylindrical wall 104. This wall 104 may be made up of a series of sections, but is a closed, air-tight vessel. Secured at the bottom of cylindrical wall 104 is a conical drain portion 106 which communicates with a pipe fitting 108, the latter affording connection to the piping of the system.

At the upper end of wall 104 is a cover member 110 secured thereto and this cover member spans the top of chambers 20 and 50. The drive mechanism between compressor motor 70 and compressor 54 extends through cover 110 and is indicated generally at 112. Condensing chamber 50 is a closed and air-tight vessel and it is maintained at a pressure of approximately 4.6 mm. Hg by a vacuum pump connected in the region of refrigeration coils 64. The only points of communication with chamber 50 are at drain portion 106, circular outlet 58 of compressor 54, connections to pipe 46 which supplies ice to trays 48, and the vacuum pump connection (not shown).

As seen in FIGS. 2, 3, and 5, a plurality of annular trays 48 are provided within condensing chamber 50. These trays are upwardly facing U-shaped channel sections having a bottom wall 114 and upwardly facing sidewalls 116. The annular trays are supported by means of studs 120 carried by cylindrical wall 104 of the condensing chamber. It will be noted that trays 48 are spaced from both cylindrical walls 94 and 104 so that vapor may pass downwardly between these walls and the sides of the trays. The outer wall 116 of each tray is provided with a series of bores 122 through which "sweet" water can drain from the trays.

As best seen in FIG. 2, each tray 48 has associated therewith a pipe connection 124, through which ice-sweet water mixture from the counter-washer is supplied to the trays. Secured at the inner end of connection 124 are two semi-circular plastic pipe sections 126 with each extending substantially half-way around the inner wall 116 of trays 48. Plastic pipes 126 are held in place on inner wall 116 of the tray by means of spring clips 128, a detail sectional view thereof being chosen in FIG. 4. At spaced intervals along their length, pipes 126 are provided with notches 130, the shape of which may best be understood by referring to the right-hand side of FIG. 3. The ends of plastic pipes 126 are closed by plugs 132.

Thus, an ice-water mixture will be forced under pressure into pipes 126 through pipe connection 124 and will be distributed about perimeter of trays 48 through notches 130. Each of the notches faces against the current of flow within pipes 126 and will cause portions of the mixture to be delivered through each notch. It is important that the greatest surface area possible of the ice be exposed to the vapor since the condensing of the vapor on the ice and the heat exchange relationship that takes place between the vapor and ice is a surface phenomenon. By this arrangement, the ice crystals are spread out throughout the extent of the tray 48.

The "sweet" water in the ice-water mixture will pass through discharge bores 122 in the outer wall of the trays and the water will fall downwardly into the bottom drain portion 106 of the condensing chamber. Also, the potable water produced by condensation of the vapor on the ice in the trays and produced by the melting of the ice in the trays will be similarly discharged from the trays.

As previously mentioned, there are some inefficiencies in the system and some heat may enter the system. Therefore, to provide a thermal balance and allow the process to proceed on a continuous basis, heat must be removed from the system. This is accomplished by conventional refrigeration unit 66, as shown in FIG. 1, which has its cold coils 64 disposed within condensing chamber 50 at the lower end thereof, as best seen in FIG. 2. These coils are spaced apart so that vapor may pass thereover. The ice in trays 48 serves as the primary low heat sink to cause condensation of the vapor. Vapor may not be allowed to build up in the condensing chamber otherwise the system will be stalled and all of the vapor must be condensed on a continuous basis. Cold refrigeration coils 64 serve as an additional low heat sink to insure that all vapor will be condensed. Also, it is important to note here that coils 64 are located near the lower end of condensing chamber 50 so that only such vapor that has passed over the ice in trays 48 will contact these coils and be condensed thereby. Such vapor will form a layer of ice on the coils until a condition of equilibrium is established beyond which additional condensation results in the formation of water which drains from the coils. Thus, only the heat of excess vapors is removed, while the accumulation of ice on the coils acts as a reservoir to accommodate excess vapor fluctuations in the system. While the vacuum pump and its connection to condensing chamber 50 is not shown, it should be noted that the suction side of the vacuum pump is connected to chamber 50 in the zone thereof or immediately below evaporator coils 64. Thus, since coils 64 remove the excess condensable vapors, the vacuum pump functions only to remove non-condensables, i.e., air. Consequently, the required vacuum pump may be of a relatively small size and there is no necessity for a cold trap in the vacuum pump connection to chamber 50.

The distributor comprises an upper central hollow manifold 148, which has a pipe 150 connected thereto, through which the incoming mixture of sea water and concentrated brine is supplied. Extending outwardly from manifold 148 is a series of upwardly opening conduits 152 (see FIG. 6) and incoming sea water enters these conduits through manifold ports 154. Departing therefrom are sheet-like members or plates 156, formed from suitable corrosion-resistant thin sheet stock, such as stainless steel or plastic. These plates present large surface areas. At the top of conduits 152 are elongated discharge openings or ports 158. Thus, the incoming sea water enters manifold 148, passes through manifold ports 154 into conduits 152, and overflows therefrom through elongated opening 158. Liquid thus discharged flows downwardly by gravity over plates 156 and is distributed over their large surfaces in a relatively thin film to give maximum surface exposure of the liquid in the evaporating chamber. Also, to increase surface exposure, ports 160 are provided at the ends of conduits 152 through ring support 164 so that water flows through these ports into contact with the inside of cylindrical wall 94 and flows by gravity downwardly along this wall.

It is necessary to have maximum freezing exposure of the raw liquid within the freezing region without increasing the size and cost of equipment. Also, evaporation is a function of time, as well as surface area, and the time of travel required for the sea water to flow down the entire length of sheets 156 is sufficient to allow 50% conversion to "sweet" water vapor and ice.

From the foergoing, it will be seen that the evaporating and condensing chambers are concentric chambers with one formed within the other. This affords several important advantages and, when the importance of economy is borne in mind, this arrangement offers substantial savings in material and in operating costs. Additionally, compactness of the equipment results and of great importance is the thermal efficiency possible.

Since the chambers are arranged one within the other, there is no necessity to apply insulating material to the inner chamber and the inner chamber is effectively insulated against entrance of external heat by the surrounding cold chamber. Evaporating chamber 20 has an ambient temperature of approximately 24.8° F., while the ambient temperature in the condensing chamber is approximately 32° F., and this small temperature differential will greatly limit the amount of heat being transferred into the evaporating chamber. It must be appreciated that these chambers are large tanks and, if the concentric arrangement were not used, many square feet of tank surface would be additionally exposed to the atmosphere with the attendant opportunities for heat to enter the system and these large surfaces would have to be insulated at substantial expense to limit as much as possible such heat entrance.

The evaporating and condensing chambers operate at a relatively low pressure and the difference in pressure between the two chambers, 3.2 mm. Hg compared to 4.6 mm. Hg, is a minor amount. Since these chambers are at such low pressures, force will be exerted by the atmosphere on the tanks, tending to push them inwardly, and the tank wall construction must be sufficiently heavy to withstand this force which amounts to many tons of force due to the large size of the tanks. The outside tank of condensing chamber 50 is of such heavy construction and has insulation material shown thereon in FIG. 1 of the drawings. However, with the arrangement of this invention, the walls of inner evaporating chamber 20 do not have to support any substantial loads because the pressure differential across the wall is quite small. Therefore, it not only eliminates the necessity of insulating this inner chamber wall, but it may be of lightweight material and, therefore, less expensive material.

Problems of corrosion are not nearly as great in a freezing system as compared to conventional systems wherein salt water is heated, but it is nonetheless advisable to make the evaporating and condensing chambers of corrosion-resistant materials or materials with protective coatings to minimize corrosion problems.

COMPRESSOR ARRANGEMENT WITH EVAPORATING AND CONDENSING CHAMBERS

An important feature resulting from our invention is that vapor formed within evaporating chamber 20 may be directly and immediately moved into condensing chamber 50 without necessitating large duct work for conveying the vapor or an extremely large housing for the compressor. By the concentric arrangement of the evaporating and condensing chambers and with the positioning of the compressor as shown, many important and significant advantages, including extremely important economical advantages have resulted.

By referring to FIG. 2, it will be seen that compressor 54 is disposed within the outer housing of the condensing-evaporating chambers. In the particular embodiment, the compressor is disposed immediately below cover 110 of chamber 50 and above cylindrical walls 94 of evaporating chamber 20. The compressor is actually supported by this cover and comprises a housing or shroud 134, having a top housing 136 and a lower housing or shroud 138, which are secured together but spaced apart around the periphery of the compressor by attachment means 140. Bottom shroud 138 is provided with the previously mentioned central inlet 56, and the annular space between the top and bottom shrouds, extending completely around the compressor, provides the circular outlet 58 previously identified. Shrouds 136 and 138 are so sealed to the walls of the chambers that the only communication between the chambers is through central inlet 56, the interior of the compressor, and circular outlet 58. Mounted within housing 134 is a rotating impeller 142 and it is important to note that this impeller is bearinged within and supported by the top cover 110 of condensing chamber 50. The housing 134 does not journal or support the impeller 142 and the housing is a lightweight shroud fully supported by cover 110, which with wall 104 is the effective support and heavy-duty housing for the compressor. As seen in the drawings, the shroud or housing 134 is of thin, light construction. Impeller 142 comprises a plurality of radially extending blades 144 and central hub 146 and is rotated by motor 70 within housing 134. It must be appreciated that in order to move the volume of vapor required, this compressor is large and rotates at a relatively high speed. For example, the diameter of impeller 142 will be approximately 7 feet and the speed of rotation will be 3,600 r.p.m. For such speed of rotation and size of impeller, it is, therefore, most important that strong and ample support be provided for the driving shaft. Since cover 110 is a substantial structural member, it is able to afford the necessary support and provide a primary housing while the actual shroud or covering for the impeller is of relatively light material. In essence, the chamber into which the compressor is discharging serves here as the housing for the compressor and support for the drive.

While the system is operating and the compressor is rotating, vapor formed within evaporating chamber 20 is drawn into central inlet 56, and is moved by rotating blades 144 radically outward at progressively increasing pressure for ultimate discharge through circular outlet 58 into condensing chamber 50. In other words, the compressor affords a direct radial path for movement of the vapor. Important also is the fact that vapor will be drawn into the compressor throughout the entire area of central inlet opening 56 and discharged throughout the entire area of circular outlet 58. Thus, vapor will be delivered around the entire annular area of condensing chamber 50 for movement into contact with the ice that has been spread out within substantially the entire area of the condensing chamber. With this concentric chamber and compressor arrangement, vapor will move from all points of discharge from the compressor in a spiral path downwardly through the condensing chamber maintaining the high velocity imparted to the vapor by the compressor. Since condensation is a function of surface contact and velocity of relative flow, this is of course advantageous. The advantages of our arrangement with regard to size and cost of equipment must be emphasized and appreciated and this close-coupled relationship of the compressor and chambers accomplishes these advantages. If a conventional volute type casing for a compressor were utilized, its diameter would be about 14 feet and to convey the volume of vapor contemplated for the type of equipment shown, ducts having diameters of approximately 6 feet would be required. Equipment of this size obviously introduces thermal losses into the system and the cost of the parts and of insulation becomes substantial.

To a large degree, vacuum freezing desalination systems have heretofore been penalized because of the failure to provide efficient and economical equipment for and arrangements of the compressor and condensing and evaporating vessels. With the arrangements contemplated in the past to move such a large volume of vapor, one would normally use an axial compressor having several stages. The cost of such a compressor arrangement alone, and certainly when combined with the cost of providing evaporating and melting vessels, would most likely exceed the permissible cost for an entire system for desalination.

This application describes a preferred embodiment of the invention in connection with a system for producing potable water from sea water, but of course, the invention has uses in other fields for other purposes and various changes and substitutions may be made in the particular apparatus or its arrangement without departing from the scope of the invention as defined in the following claims.

We claim:

1. In apparatus for separating a solvent from a solution, an evaporating chamber, means for introducing the solution into said evaporating chamber, a condensing chamber, a compressor for moving vapor between said chambers, said chambers and compressor being coaxial and contiguous, means to maintain said chambers at low pressure and temperature, means for evaporating said solution in said evaporating chamber to produce vapor of the solvent and ice of the solvent, means for transferring ice from said evaporating chambers to said condensing chamber, said vapor being moved by said compressor from said evaporating chamber to said condensing chamber, and said vapor of said solvent condensing on said ice in said condensing chamber.

2. The apparatus of claim 1 wherein said compressor is a radial compressor.

3. The apparatus of claim 1 wherein said compressor is disposed within one of said chambers.

4. The apparatus of claim 3 wherein said one of said chambers has a wall supporting said compressor, said compressor having a relatively lightweight shroud and a rotor disposed within said shroud.

5. The apparatus of claim 4 wherein said shroud provides communication between said chambers only through said shroud.

6. The apparatus of claim 4 wherein a pressure differential between said chamber is produced by operation of said compressor and said one chamber provides a structural housing for said compressor against atmospheric pressure.

7. The apparatus of claim 3 including a drive motor for the compressor mounted externally of, and supported by, one of said chambers, and a motor shaft extending into said one chamber in driving engagement with said compressor.

8. The apparatus of claim 1 wherein said chambers are coaxial tanks, said evaporating chamber is placed within said condensing chamber, and said compressor is disposed within said condensing chamber.

9. The apparatus of claim 8 wherein said compressor spans across said evaporating chamber and affords communication through the compressor between said chambers.

10. The apparatus of claim 8 wherein said compressor has a vapor inlet within said evaporating chamber and an outlet within the condensing chamber, said outlet extending substantially completely around said compressor, said vapor being discharged throughout the periphery of said compressor into said condensing chamber.

11. The apparatus of claim 1 including means to discharge vapor from said compressor throughout the cross-sectional area of said condensing chamber.

12. In apparatus for separating sweet water from salt water, an evaporating chamber, means for introducing salt water into said evaporating chamber, said salt water evaporating in said evaporating chamber to produce sweet water vapor and ice of sweet water, a condensing chamber, a compressor for moving vapor between said chambers, means for transferring ice from said evaporation chamber to said condensing chamber, said vapor condensing on said ice in said condensing chamber to produce sweet water liquid, said chambers and compressor being coaxial and contiguous.

13. The apparatus of claim 12 wherein said compressor is a radial compressor.

14. The apparatus of claim 12 wherein said compressor is disposed within one of said chambers.

15. The apparatus of claim 14 wherein said one of said chambers has a wall supporting said compressor, said compressor having a relatively lightweight shroud and a rotor disposed within said shroud.

16. The apparatus of claim 15 wherein said shroud provides communication between said chambers only through said shroud.

17. The apparatus of claim 15 wherein a pressure differential between said chamber is produced by operation of said compressor and said one chamber provides a structural housing for said compressor against atmospheric pressure.

18. The apparatus of claim 14 including a drive motor for the compressor mounted externally of, and supported by, one of said chambers, and a motor shaft extending into said one chamber in driving engagement with said compressor.

19. The apparatus of claim 12 wherein said chambers are coaxial tanks, said evaporating chamber is placed within said condensing chamber, and said compressor is disposed within said condensing chamber.

20. The apparatus of claim 19 wherein said compressor spans across said evaporating chamber and affords communication through the compressor between said chambers.

21. The apparatus of claim 19 wherein said compressor has a vapor inlet within said evaporating chamber and an outlet within the condensing chamber, said outlet extending substantially completely around said compressor, said vapor being discharged throughout the periphery of said compressor into said condensing chamber.

22. The apparatus of claim 12 including means to discharge vapor from said compressor throughout the cross-sectional area of said condensing chamber.

23. In apparatus for separating a solvent from a solution, an evaporating chamber, means for introducing the solution into said evaporating chamber, a condensing chamber, a compressor for moving vapor between said chambers, said chambers and compressor being coaxial and contiguous, said compressor having an outlet opening directly into said condensing chamber, means to maintain said chambers at low pressure, means for evaporating said solution in said evaporating chamber to produce vapor of the solvent and ice of the solvent, means for transferring ice from said evaporating chamber to said condensing chamber, said vapor being moved by said compressor from said evaporating chamber to said condensing chamber, and said vapor of said solvent condensing on said ice in said condensing chamber.

24. In freezing apparatus for separating a solvent from a solution, an evaporating chamber, means for introducing the solution into said evaporating chamber, a condensing chamber, a compressor for moving vapor between said chambers, said chambers and compressor being coaxial and contiguous, means to maintain said evaporating chamber at a pressure sufficient to permit vapor and ice to form in the evaporating chamber, means for removing ice from said evaporating chamber, and means for delivering said vapor to the condensing chamber for removal of heat from the vapor in the condensing chamber by transfer of said heat to said ice to condense the vapor and to melt the ice.

References Cited by the Examiner

UNITED STATES PATENTS

| | | | |
|---|---|---|---|
| 3,000,795 | 9/1961 | Goeldner | 202—57 |
| 3,049,889 | 8/1962 | Carfagno | 62—58 |
| 3,136,707 | 6/1964 | Hickman | 202—236 |

FOREIGN PATENTS 985,905   3/1951   France.

OTHER REFERENCES

Publication: "Development of a Continuous Wash-Separation for Saline Water Conversion," report November 23, January 1957, pages 1–3 and Figures 1 and 2.

ROBERT A. O'LEARY, *Primary Examiner.*